United States Patent [19]
Graffman

[11] 3,808,699
[45] May 7, 1974

[54] DRYING METHOD AND APPARATUS THEREFOR

[76] Inventor: Johan Holger Graffman, 9 Blomstervagen, Danderyd, Sweden

[22] Filed: Sept. 6, 1972

[21] Appl. No.: 286,544

[30] Foreign Application Priority Data
Sept. 10, 1971 Sweden............................ 11493/71

[52] U.S. Cl..................... 34/92, 159/4 E, 159/1 A, 431/1, 34/15
[51] Int. Cl............................................. F26b 5/04
[58] Field of Search................. 34/15, 5, 92; 431/1; 159/1 A, 4 E; 432/12

[56] References Cited
UNITED STATES PATENTS

| | | | |
|---|---|---|---|
| 3,618,655 | 11/1971 | Lockwood............................ | 159/4 E |
| 281,912 | 7/1883 | Morrell............................... | 159/4 B |
| 3,600,116 | 8/1971 | Clark, Jr. et al...................... | 431/1 |
| 3,273,631 | 9/1966 | Neuman............................... | 159/1 A |
| 2,576,297 | 11/1957 | Horsley et al....................... | 159/1 A |
| 3,255,534 | 6/1966 | Kan.................................... | 34/15 X |
| 1,866,346 | 7/1932 | Clark................................. | 34/15 Y |
| 662,509 | 11/1900 | Van den Broek..................... | 159/4 J |

Primary Examiner—William E. Wayner
Assistant Examiner—William C. Anderson
Attorney, Agent, or Firm—Stevens, Davis, Miller & Mosher

[57] ABSTRACT

A drying apparatus for moist material comprising a drying chamber having material supply inlets, a material discharge outlet and a pressure check valve outlet for exhausting gases, a combustion chamber having a stop valve inlet for combustibles, and an outlet in the form of a conduit interconnecting the combustion chamber with the drying chamber and means to ignite the combustibles in the combustion chamber.

6 Claims, 1 Drawing Figure

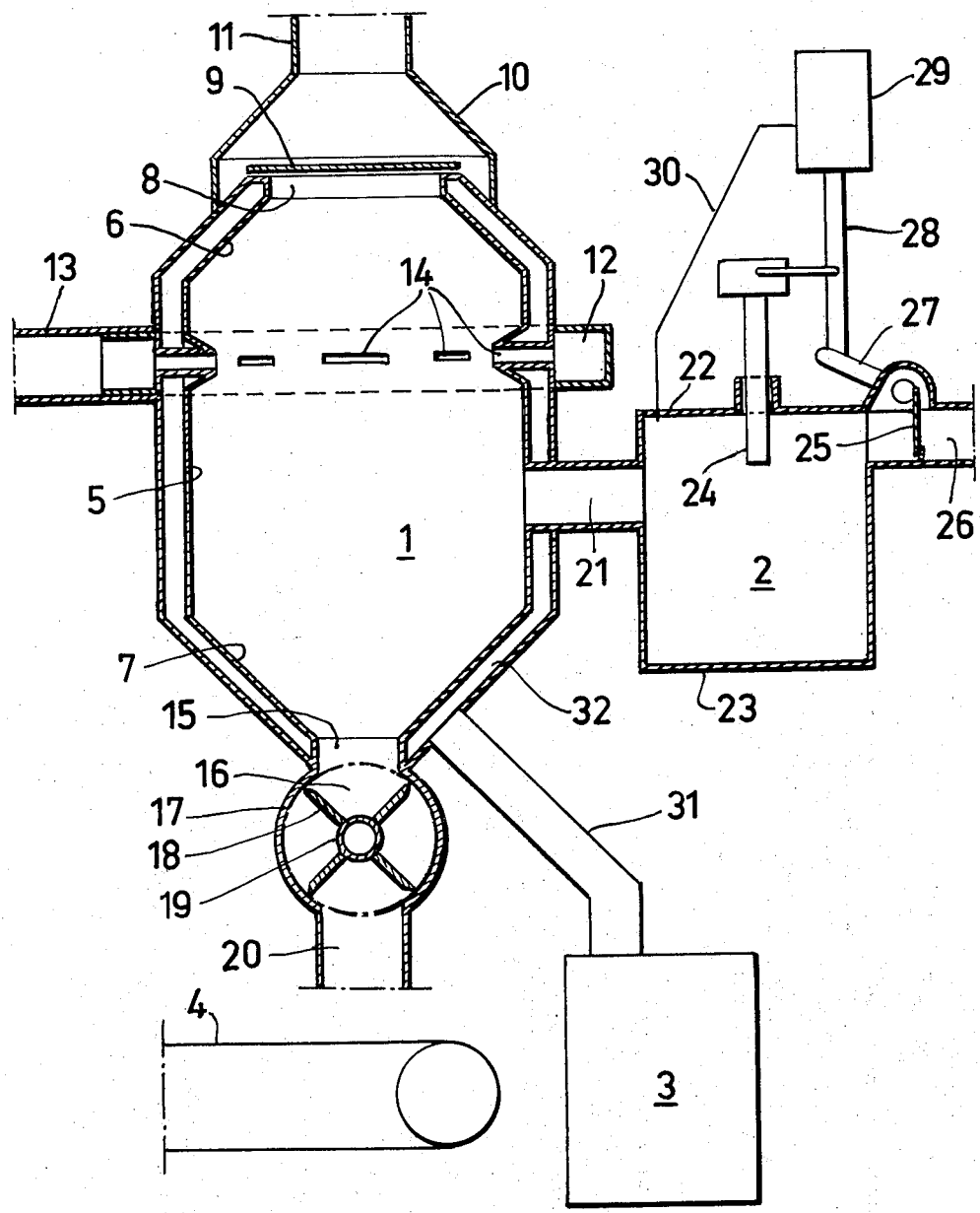

DRYING METHOD AND APPARATUS THEREFOR

This invention relates to a method and an apparatus for drying moist material, preferably material in the form of granules, powder, slurry, slime or the like.

In connection with the development and operation of waste water purifying plants large amounts of slurry are obtained. The slurry contains substances, which are of great value if the slurry can be utilized as a soil improvement agent. Its high moisture content however, involves such high transportation cost per weight unit of useful substance that such a slurry is far from being a product which can be utilized commercially, but constitutes a large problem at purifying plants of the above kind.

The water content of the slurry which is very high from the beginning certainly can be reduced substantially by storing the slurry in sedimentation basins, and by rendering the drying more effective the moisture content of the slurry can be cut to half of the original value or substantially less. An additional drying in a sufficient degree by such methods would result in unreasonably large plants requiring large capital investments which would put an unacceptably high economic load on the dried product. At said moisture content, approx. 50 percent, the slurry still cannot be utilized commercially, not only because of the aforesaid load in the form of high transportation costs, but also in view of its consistency which is such that it cannot be spread on arable land and the like by agricultural machines of normal type.

Several attempts and efforts have been made to solve the problem of effecting an acceptable drying of slurry at reasonable costs by arrangements of various kind. It was tried, for ecample, to utilize the heat content in refuse and garbage for the drying of slurry, but so far only with negative result. The varying composition of the refuse as well as other circumstances, troublesome handling etc. render necessary plants such large and complicated that the released heat amounts after their transformation into a state applicable to drying purposes are much too expensive. There exists at present no known method by which the slurry, which now constitutes a great problem for the existing purification plants as well as for those being built in an ever increasing number, can be dried in an economical way and thereby be transformed into a commercial product.

The present invention solves the aforesaid problems. Not only renders it possible a satisfactory economic operation, but it also brings about a dried substance in a form adapted for spreading by agricultural machines, manure spreaders, of usual types.

An embodiment of the invention is shown in the accompanying drawing, and its components and mode of operation are described in the following with reference to said drawing.

The main components are a drying chamber 1 shown in a longitudinal section and an explosion chamber 2 also shown in a longitudinal section. The plant further includes a heat source 3 and a conveying belt 4.

The drying chamber is formed substantially as a cylinder with double casing walls 5 and terminates upwardly and downwardly in cone-shaped portions 6, 7. The drying chamber is provided upwardly with an opening 8, which is closed by a disk valve 9 enclosed by a smoke hood 10 with associated chimney 11. Said disk valve is arranged so as to allow the passage of gases to the chimney at a small excess pressure in the drying chamber, but otherwise to be tightly closed. About the cylindric portion of the drying chamber there is provided an annular passageway 12 to which a feed pipe 13 is drawn. From said passageway 12 extend nozzle-shaped apertures 14 opening into the drying chamber. In the lower portion of the drying chamber an opening 15 is provided and connected to a sluice device 16, which comprises an outer cylindric portion 17 and a shaft 19. Said shaft is provided with vanes 18, which upon rotation of the shaft transport material from the discharge opening of the drying chamber to an outlet 20, which opens above a conveying means 4 without affecting appreciably the pressure conditions within the drying chamber.

The drying chamber is connected by a pipe 21 to an explosion chamber 2, which comprises a cylinder with a sealing cover 22 and bottom 23. The cover includes a bushing for an electric ignition device 24, and a feed channel 26 provided with a stop valve 25 is drawn to the explosion chamber. Said stop valve is provided with an internal arm 27, which by a rod 28 is connected to a sensing device 29 sensing the pressure in the explosion chamber through a pipe duct 30. The stop valve with associated arm, rod and sensing device is arranged so as to be locked in closed position and be released so that it can open only at a certain predetermined vacuum prevailing in the explosion chamber.

The boiler 3 communicates by a pipe connection 31 with the intermediate space 32 in the double casing walls of the drying chamber.

The function of the plant is described in greater detail in the following, but for the sake of clearness only the main principles will be dealt with. The object of the explosion chamber is to bring about variations in the pressure, pressure pulsations in the drying chamber, which vary between a highest pressure somewhat exceeding the atmospheric pressure and a lowest pressure substantially below the atmospheric pressure. The pressure pulsations are controlled in such a way that the periods of prevailing low pressure are of a duration as long as possible, thereby creating ideal conditions for a rapid and effective drying of material placed in the drying chamber. The developing water vapour is driven out of the drying chamber during the periods when the pressure in the drying chamber exceeds the atmospheric pressure.

The material, slurry or the like, to be dried is pretreated to a dough-like consistency and supplied to the plant through the pipe 13 under pressure, which is created by a screw or in another way. The slurry is advanced by the pressure via the passageway 12 to the nozzles 14, the openings of which are of a design such that the slurry fed into the drying chamber is given a rectangular or star-shaped cross-section rendering a large outer surface in relation to the corresponding volume. Within the drying chamber a very low pressure prevails during certain periods and a temperature suitably adjusted, as a result of which the mass of slurry introduced in the aforedescribed manner is dried out rapidly and effectively. The drying takes place as the slurry mass is injected into the drying chamber, and the dried substance is collected in the lower portion of the drying chamber, from which it is discharged via the opening 15 to a conveying means 14 by means of a sluice device 16. The temperature in the walls of the drying chamber can be held at a suitable level by supplying heat from the boiler 3 via the pipe connection 31 to the intermediate space 32 in the double casing of the drying chamber.

The aforesaid pressure pulsations in the drying chamber by which periods of a sufficiently low pressure with resulting drying effect are brought about in the drying chamber, are produced by the explosion chamber 2 and transported to the drying chamber through the passageway 21. The pressure pulsations are created in the manner as follows. The procedure is started by supplying the feed duct 26 with a suitably balanced mixture of fuel and air. The stop valve 25 permits the passage of the fuel-air mixture to the explosion chamber 2. At a suitable moment when the explosion chamber is filled the explosive fuel-air mixture is ignited by the electric ignition device 24. The combustion of explosion nature brings about a rapid pressure increase in the explosion chamber in the first moment, at which the stop valve 25 is closed. Said pressure, however, is drained rapidly via the gas passageway 21 and drying chamber 1, past the disk valve 9 and out through the chimney 11.

The pressure wave also effectively flushes gases out of the drying chamber, especially water vapour from dried slurry. This takes place very rapidly and brings about in the drying chamber and explosion chamber with associated connecting passageway a pressure which at the same moment when the explosion-like combustion comes to its end exceeds the ambient atmospheric pressure only insignificantly. The pressure in question can be predetermined by the design of the disk valve 9. The gas temperature at the end of the explosion, of course, is very high, by estimate about 1,500°C, but it falls rapidly to a temperature not far from the temperature of the surrounding walls. According to the simple gas laws, the result thereof is a corresponding substantial decrease in pressure because the volume at least approximately is constant. The volume is maintained unchanged due to the fact, that the stop valve by force is kept closed by the sensing member 29 by means of the rod 28 and arm 27. This gives rise to the aforementioned period during which a pressure substantially below the atmospheric pressure prevails in the drying chamber. The water, which leaves the slurry in the drying chamber reduces, however, in gaseous state gradually its volume, which results in a corresponding pressure increase. When hereby the pressure in the explosion chamber has increased to a certain level, which still is somewhat below the atmospheric pressure, the stop valve 25 is released. The valve opens and permits a further dose of fuel-air mixture to pass into the explosion chamber where it is ignited. The procedure is repeated in the manner described above.

The invention can be imagined to be varied, for example, such that the transfer of the heat content in the combustion gases to the slurry takes place indirectly by another transfer medium or via heat exchanging surfaces. Furthermore, a part of the heat content in the combustion gases may be led to the intermediate space 32 between the double casing walls of the drying chamber.

The aforedescribed drying plant offers obvious advantages. By utilizing a vacuum which can be obtained by the apparatus described, the amounts of energy supplied in the form of fuel are utilized for the operation of the plant to a much higher degree than it is possible at drying plants of conventional type where the drying takes place by transfer of heat to the material to be dried. Vacuum drying per se, it is true, is not unknown, for example in the foodstuffs-industry, but there it is carried out with entirely different methods, which have no similarity with the invention described above.

A drying plant of the kind described above further shows the advantages a.o. that a plant with high capacity can be given a compact design, that it can operate continously with low operation and maintenance costs, and that the drying can be driven to a level at which from economic as well as practical aspects a slurry heretofore unapplicable can be converted into a commercialy usable product.

What I claim is:

1. An apparatus for drying moist material comprising a drying chamber having material supply inlets, a material discharge outlet and a pressure check valve outlet for exhausting gases, a combustion chamber having a stop valve inlet for combustibles, and an outlet in the form of a conduit interconnecting the combustion chamber with the drying chamber and means to ignite the combustibles in the combustion chamber.

2. The ayparatus according to claim 1, wherein the outlet of the combustion chamber opens directly into the drying chamber.

3. The apparatus according to claim 1, wherein the drying chamber has a double casing wall, the interior of which communicates with a heat source.

4. The apparatus according to claim 1, wherein said material supply inlets are spaced openings peripherally arranged in the wall of the drying chamber and interconnected to a common header circumscribing the drying chamber, said inlets being spaced and shaped to give a large surface to volume ratio.

5. The apparatus according to claim 4, wherein the material supply inlets are in the shape of stars.

6. The apparatus according to claim 4, wherein the material supply inlets are in the shape of rectangles.

* * * * *